United States Patent Office 2,994,666
Patented Aug. 1, 1961

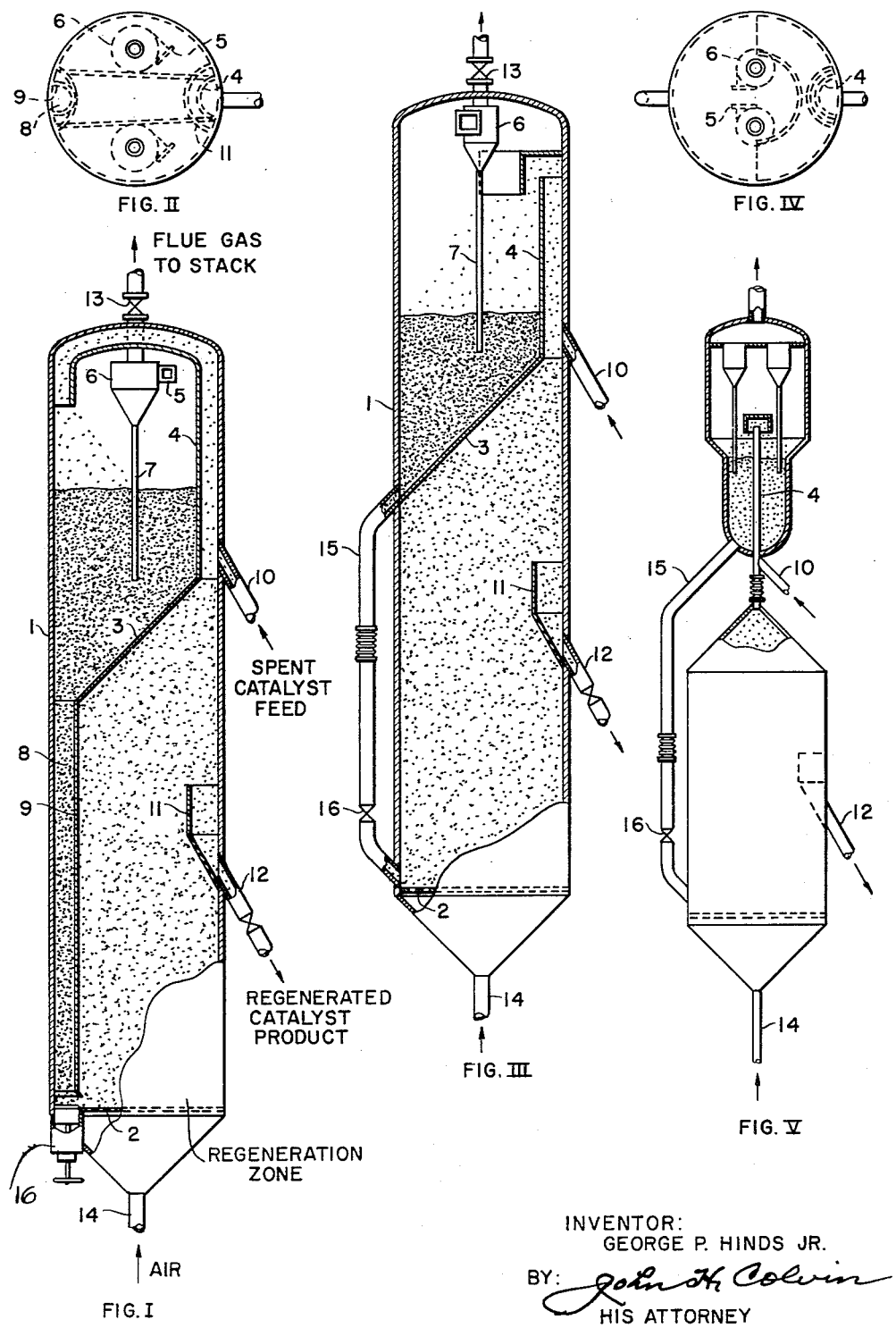

2,994,666
REGENERATION OF FINELY DIVIDED
CATALYSTS
George P. Hinds, Jr., Pasadena, Tex., assignor to Shell Oil Company, a corporation of Delaware
Filed Dec. 24, 1957, Ser. No. 705,065
3 Claims. (Cl. 252—417)

This invention relates to an improved method and apparatus for the regeneration of finely divided catalysts by the burning of carbonaceous deposits therefrom. The invention relates particularly to the regeneration of cracking catalyst, e.g. silica-alumina cracking catalyst, in the form of a powder or microspheres passing for the most part a 100 mesh U.S. standard sieve.

In many operations where carbonaceous reactants are contacted with a solid catalyst at an elevated temperature upward of about 250° C. the catalyst becomes deactivated by the deposition on its surface of carbonaceous tarry or coke like deposits. Such deposits are normally removed from the catalyst by burning under controlled conditions. In the catalytic cracking of hydrocarbon oils such burning or regeneration is effected with air at temperatures between about 500 and 650° C.

In such cases where frequent regeneration of the catalyst is required it is conventional to use the so-called fluid catalyst technique since this allows the catalyst to be continuously cycled through a separate regenerator wherein it is continuously regenerated under desired controlled conditions. The present invention relates to an improved method and apparatus for effecting such regeneration.

An object of the invention is to provide a method and apparatus wherein higher burning rates may be achieved thereby allowing a smaller regeneration zone to be used.

Another object of the invention is to provide an improved method and apparatus wherein afterburning may be avoided without resort to the use of water sprays.

Another object of the invention is to provide a method an apparatus wherein better utilization of the oxygen in the compressed air may be achieved.

Another object of the invention is to provide a method and apparatus wherein the cyclone loading may be reduced thereby decreasing the tendency to lose catalyst with the flue gas.

Another object of the invention is to provide a method and apparatus which allows a more complete regeneration with less loss of catalyst activity due to localized overheating.

Another object of the invention is to provide a method and apparatus wherein the pressure drop across the stack damper may be reduced thereby reducing the erosion and silencing problems at this point.

The method of the invention in outline comprises introducing air into the bottom of a bed of catalyst undergoing regeneration in a regeneration zone, passing the air up through said bed at a rate to maintain the catalyst in a fluidized condition and to provide an exit gas containing at least about 2% oxygen, maintaining the regeneration zone filled with catalyst, continuously withdrawing regenerated catalyst product by gravity flow directly from the fluidized bed in the regeneration zone, passing out of the top of the regeneration zone partially utilized regeneration gas containing a substantial concentration of catalyst in suspension, continuously adding spent catalyst to be regenerated to said suspension and passing the resulting mixture up through a long narrow regeneration zone (riser reactor) to an upper separation and collecting zone, withdrawing flue gas substantially free of catalyst from the upper separating and collecting zone, passing catalyst from the collecting zone by controlled gravity flow to the first mentioned regeneration zone, and controlling the concentration of suspended catalyst passing out of the top of the first mentioned regeneration zone and into the said long narrow regeneration zone at a value of at least about 1.5 kilograms of catalyst for cubic meter of gas by controlling the rate of said last mentioned gravity flow of catalyst from the hopper to the first mentioned regeneration zone.

The method will be described in more detail in connection with the accompanying drawings which show semi-diagrammatically certain applicable variations in the regeneration apparatus according to the invention and wherein:

FIGURES I and II are elevation and plan views of a single vessel form of a suitable apparatus drawn approximately to scale except for the cyclone arrangement which is schematic.

FIGURES III and IV are elevation and plan views of a single vessel form of apparatus with exterior standpipe and control valve, altered catalyst separation scheme, and with a short riser regenerator.

FIGURE V is a diagrammatic elevational view of a two-vessel form of apparatus with riser and external standpipe.

Referring to FIGURES I and II the apparatus comprises a single cylindrical vessel with elliptical head and conical bottom. Located near the bottom, e.g. at the junction of the conical and cylindrical sections, is an air distributing means which in the case illustrated is in the form of a grid 2 having about 5% open area. Somewhat above the middle, the vessel is provided with a slanting partition 3 which, except for the inlets to the lines to be mentioned, covers the entire cross sectional area and therefore divides the volume into two separate parts. In the top of the slanting partition next to the wall of the vessel an opening communicates with a long narrow channel which as shown in FIG. II is formed by a half pipe 4 welded or otherwise fastened to the vessel wall. This channel is carried up to the top of the vessel, across the top, and part way down on the opposite side, to discharge into the upper space in a downward direction preferably at a level below the inlets 5 of the cyclone separators 6.

Suitable centrifgual separators, illustrated schematically as cyclone separators 6, are provided within the vessel as close to the top as practical. These cyclone separators are provided with standpipe dip legs 7 which extend down to near the partition 3 and are of sufficient length to ensure gravity flow of the separated catalyst into the vessel.

At the low side of the partition 3 another opening leads to a standpipe 8 which in the case illustrated is formed by welding or otherwise fastening a half pipe 9 to the vessel wall. This long narrow channel extends down to near the grid 2. At the bottom of the channel 8 the apparatus is provided with a plug valve 16 of conventional design arranged to control the flow down through the channel 8.

At approximately the position shown, a line 10 is provided for the introduction of spent catalyst to be regenerated.

Below the partition 3 a baffle 11 is provided near the vessel wall to form a quiescent zone just above the opening into the outlet line 12 for withdrawal by gravity flow of regenerated catalyst.

The pressure in the system is controlled by control of the stack valve 13 which in practice is a slide valve.

Referring again to FIGS. I and II the operation is as follows. Air is compressed, e.g. to 30 p.s.i.g., and passed into the bottom of the regenerator by line 14. No catalyst is normally carried in this air. The air passes through the distributor grid 2 where it suffers a small pressure loss of about 0.5 to 1 p.s.i.g. and then up through the regeneration zone the upper limit of which is defined by the slanting partition 3. This zone is maintained full of catalyst. As will be explained the operation is controlled so that at no point below the partition 3 and above the grid 2 is the concentration of catalyst less than about 1.5 kilograms of catalyst per cubic meter of gas. The air is passed through this regeneration zone at a fairly high rate sufficient to maintain the catalyst well fluidized and at such a rate that the oxygen concentration in the gas at the top (right side) of partition 3 is at least about 2%. The material entering the long narrow channel defined by pipe 4 therefore, being a suspension of at least 1.5 kilograms of catalyst per cubic meter of gas and containing unused oxygen, is passed up through such channel, across the top of the apparatus, and is discharged downwardly into the upper section above the partition 3. The flue gas after passing through the cyclone separator 6 to remove any entrained catalyst is passed through valve 13 to the stack and the separated catalyst collects as a dense bed in the upper section above partition 3.

In operation spent catalyst to be regenerated is continuously passed into pipe 4 at about the position shown where it joins the suspension coming from the regeneration zone and is passed together therewith to the upper chamber. The catalyst in pipe 4 is in suspension and not in a fluidized or pseudo-liquid state. For example the density may be from about 7.5 to 25 kilograms per cubic meter as compared to from about 160 to 800 kilograms per cubic meter in the dense bed in the upper zone. In a typical case the density of the suspension entering pipe 4 from the regeneration zone is about 6 kilograms per cubic meter and after injecting the spent catalyst by line 10 it is about 18 kilograms per cubic meter. In a typical case where the spent catalyst feed to the regenerator is about 10 metric tons per minute and the amount of air supplied is about 1,400 standard cubic meters per minute the catalyst rate in line 4 is about 15 metric tons per minute. About 15 metric tons per minute are therefore passed from the upper zone to the lower zone by channel 8 and 10 metric tons per minute of regenerated catalyst are withdrawn by line 12 as product of the processes.

An important feature of the invention is that with the regeneration zone approximately as shown where the horizontal cross section diminishes upon approaching the outlet (inlet to pipe 4) the concentration of catalyst carried up into line 4 may be nicely adjusted at will by controlling the flow down through channel 8 at any desired value above that of the balanced flows of spent catalyst into the unit and regenerated catalyst out of the unit. Thus, for example, by merely increasing the flow by opening valve 16 the catalyst concentration in the line 4 may be increased from the above 18 kilograms per cubic meter to 24 kilograms per cubic meter; or by closing down on valve 16 it may be decreased to 14 kilograms per cubic meter but, of course, this flow can never be less than the concentration of the freshly charged spent catalyst and the air supplied at the bottom, i.e. about 10 kilograms per cubic meter in the case of the example just described.

The catalyst is normally a silica-alumina cracking catalyst but may be other cracking catalyst or catalysts spent in other processes where carbonaceous reactants are treated with the catalyst under conditions where the catalyst becomes contaminated with carbonaceous deposits which can be removed by burning.

The temperature when regenerating cracking catalyst is normally between about 525° C. and 675° C. For other catalysts the temperature is retained at a safe level where burning may be effected without damaging the catalyst by overheating. The maximum safe temperature may be easily determined for any given catalyst by a simple laboratory test.

As explained above the concentration of catalyst at the entrance to line 4 (which is the point of lowest catalyst concentration in the regeneration zone) is held above at least about 1.5 kilograms per cubic meter by control of the flow of catalyst through the downcomer or standpipe 8. The maintenance of this minimum catalyst concentration allows a high air rate to be used so that the concentration of oxygen in the gas at the entrance to line 4 is at least about 2% and preferably from about 2 to 5%. This means that the log mean partial pressure of oxygen in the regeneration zone is much higher than the conventional regeneration where in order to obtain efficient utilization of the oxygen (compressed air) and avoid afterburning it is necessary in practice to operate under conditions such that the flue gas contains not more than about 1% oxygen and preferably about 0.5% oxygen. Under these conditions the log mean oxygen partial pressure is much lower and the burning rate in terms of kilograms of carbon burnt per kilogram of catalyst in the regeneration zone per hour is quite low.

In conventional so-called downflow regenerators (i.e. where the regenerated catalyst is withdrawn by gravity flow from the fluidized bed in the regenerator) it is known that due to mixing the composition of the gas phase from a few centimeters above the grid or other distributor to the top is essentially uniform. In the present process the high air velocity and the large flow of catalyst from the bottom of the regenerator to the top tend to maintain a more uniform flow pattern with less back mixing and this also tends to increase the log mean partial pressure at a given exit oxygen concentration and hence the burning rate.

As a result of the high log mean partial pressure of oxygen which may be applied according to the invention the regenerator required to regenerate any given flow of spent catalyst can be made smaller. As will be explained further on, other features of the process also contribute towards this end. Also, higher regeneration temperatures can be applied since afterburning can be avoided by maintaining a suitable catalyst concentration at the inlet to line 4 as described. A higher regeneration temperature also increases the burning rate and allows a smaller regeneration zone and catalyst holdup to be applied.

These features are particularly important when regenerating catalytic cracking catalyst since in the regeneration of catalytic cracking catalyst the flue gas normally contains a high concentration of carbon monoxide and the phenomenon known as afterburning is normally almost certain if the temperature is above about 600° C. and the concentration of oxygen in the gas is above about 0.5%. With reforming catalysts such as those comprising a supported Group VI metal oxide this is not so much of a problem since the burning of the carbonaceous deposits from catalysts of this type produces mainly carbon dioxide with little carbon monoxide. Normally a high concentration of oxygen in the exit gas from the regeneration zone cannot be tolerated because of afterburning unless the nominal regeneration temperature is reduced and this is undesirable because it reduces the burning rate. Furthermore, a high concentration of oxygen in the gas leaving the regeneration zone is normally highly undesirable since it represents waste of compression cost which is a very important item in the overall processing cost. In the process of the present invention, on the other hand, the oxygen utilization is even better than in conventional downflow regenerators. Thus, although the gas leaving the regeneration zone where the main part of the regeneration takes place contains up to about 5% oxygen, this oxygen is substantially all consumed in the dispersed phase preliminary regeneration which takes place in the pipe 4. The spent catalyst entering the line 10 contains not only carbon but a certain amount of hydrogen which tends to burn more readily than the carbon. When the spent catalyst is introduced into the riser line as explained and illustrated substantially all of the unused oxygen is profitably consumed. It has been determined that the burning rate in such a riser line is several times that in a conventional dense bed regenerator. This allows substantially complete oxygen utilization in spite of the relatively low partial pressure of oxygen and the short residence time in the line. Therefore the compression cost is all profitably utilized and in addition there is no danger of afterburning in the upper chamber.

In addition to this benefit or advantage a further and significant advantage is obtained. The oxygen in line 4 is, of course, not sufficient to regenerate the spent catalyst introduced via the riser. Nevertheless the heat generated in the reaction of the oxygen present, as well as the heat introduced with the sizable amount of hot catalyst from the regeneration zone, causes a substantial volatilization of the tarry deposits from the catalyst and the removal of this material with the substantially oxygen free flue gas leaving the unit decreases the amount of material which has to be burned and hence the cooling requirements and amount of compressed air that has to be supplied. There is also the additional advantage that the exit gas if passed to a boiler to utilize its carbon monoxide content is increased in heating value by the material vaporized from the catalyst before the spent catalyst reaches the dense bed regeneration zone where the oxygen is sufficient to burn such material.

There are further advantages of the process and apparatus of the invention which are not so apparent. Thus in any case where a large amount of gas is contacted with a finely divided solid, such as here, there is bound to be a certain amount of loss of the solid with the effluent gas which amount is dependent upon the efficiency of the solids recovery system. The amount lost is normally approximately proportional to the concentration of solids in the gas passed to the recovery system, e.g. cyclone separators. There have been other systems suggested where a suspension of finely divided catalyst is discharged from a narrow riser line into the so-called disengaging space above a fluidized bed of catalyst in which disengaging space the entrance to the cyclone separators are located and one such operation has been commercially applied. In these prior suggested operations the separation equipment usually is called upon to separate not only the solids so introduced into the disengaging space but also the solid carried into the disengaging space by a lively flow of gas charging up from the fluid bed below the disengaging space.

In the process and apparatus of the present invention a small amount of gas may be introduced into the bed of catalyst in the upper zone above partition 3, by means not shown but the amount that may be required is only sufficient to keep solid free flowing and need not be sufficient to be a material factor. For example, the minimum gas flow rate to keep cracking catalyst free flowing is less than 3 cm./sec. superficial velocity; this flow rate contributes practically nothing to the cyclone loading. Consequently with the apparatus described the loading to the separation system is actually only that caused by the discharge of the catalyst suspension from line 4. It will be understood however that additional gas may be introduced in the bed of catalyst above partition 3 to increase its fluidity. In any case the increase in the cyclone loading due to such gas will be minor.

As compared to the fluidized catalyst regeneration presently in use the process and apparatus of the present invention allow a more complete regeneration to be effected. This is due to the higher oxygen partial pressure in the regeneration zone and to the closer approximation to concurrent flow in the fluidized catalyst regeneration zone caused by the higher air velocity and catalyst flow rate in said zone. Thus, whereas in commercial operations the carbon content of the spent catalyst may, for example, be reduced from 0.85% to 0.41%, it is possible by the present invention to effect a reduction to less than 0.41% with a commensurate increase in activity of the regenerated catalyst.

Another advantage of the process of the invention is in decreasing the pressure drop across the stack valve. The regeneration of catalysts by burning is usually effected under a superatmospheric pressure of at least a few pounds per square inch and the exit gases are released to the atmosphere through a control valve which may be of the butterfly type but is usually a slide valve. A problem arises at this point due to erosion in and around this vent valve. The erosion, other things being equal, is a function of the pressure drop across this valve. In prior commercial operation the pressure on the up-stream side of this valve has been the nominal regeneration pressure which is required to maintain the whole system in pressure balance (including the cracking system). In the process and apparatus of the present invention this problem is made less important since although the pressure in the regenerator proper (dense bed below partition 3) is the same, a definite pressure drop is taken in elevating the spent catalyst in the riser 4 so that the gas entering valve 13 is at a lower pressure. Consequently, even at a given catalyst concentration the erosion is decreased.

The method of the present invention does not permit of appreciable variation. The apparatus in which the method may be carried out does however permit of some variation as is indicated by FIGS. III to V of the drawings.

In the apparatus illustrated in FIGS. III and IV the same principles of operation are followed. The differences are that the riser regenerator formed by pipe 4, which again is of such cross section that the catalyst is carried in suspension and not allowed to settle as in the lower section, is shorter and the transfer of catalyst from the upper hopper to the regeneration zone is by means of an external standpipe 15 provided with control valve 16. The shorter riser pipe is permissible where the oxygen content of the gas entering this pipe is not above about 5% and/or the hydrogen content of the carbonaceous deposits in the spent catalyst is above about 3%.

It will be noted that in designing apparatus to operate according to the invention the aim will be to minimize the amount of pseudo-liquid catalyst in the upper zone to the amount desired to allow some flexibility in the operation. On the other hand it is essential to assure a pressure balance, i.e. the top pressure plus the "hydrostatic head" of fluidized catalyst from the top of the catalyst bed to the bottom of the standpipe must exceed the pressure in the lower vessel near the standpipe exit by an amount sufficient to ensure flow and provide a pressure drop across the control valve sufficient to allow control of the flow. The minimum difference is about 0.1 kg./cm.$^2$. With the arrangement shown in FIGS. III and IV this pressure difference may in some cases only be attained with a large holdup of catalyst in the top chamber. It is for this reason that in such cases an arrangement such as that shown in FIGS. I and II is preferred, since with this arrangement a relatively long disperse phase preliminary regeneration zone is obtained without increasing the catalyst holdup. In many cases, however, such a long dispersed phase preliminary regeneration is unnecessary since, as pointed out above, the burning rate in such transfer line regeneration has been determined to be many times that for conventional fluid catalyst rates and it is only necessary that the transfer line be of sufficient length at the gas flow rates contemplated to reduce the oxygen concentration to below 1% and preferably 0.5%. This ensures that afterburning will not be started in the disengaging space above the fluidized bed in the upper section which, it will be noted, is the only disengaging space in the entire apparatus.

In some cases where the difference between the densities in the fluidized bed in the regeneration zone and in the standpipe is low the arrangement illustrated diagrammatically in FIG. V may be better since this design, although more costly, allows the inactive volume of fluidized catalyst in the upper zone to be retained at a minimum while allowing the riser length to be extended to any practical length and assures that the necessary pressure balance as mentioned above may be achieved.

In the apparatus illustrated in FIGS. III to V like parts are designated with the same reference numbers and since the operation when controlled as described is essentially the same it is not deemed necessary to redescribe the operation of these variations of the apparatus.

I hereby claim as my invention:

1. Process for the regeneration of spent catalyst by burning carbonaceous deposits therefrom which comprises introducing air into the bottom of a fluidized bed of cracking catalyst deactivated in catalytic cracking of a hydrocarbon oil and undergoing regeneration in apparatus provided therefor including as an integral regeneration zone a first and a superposed second spent catalyst combustion space under regeneration conditions maintained at a temperature and for a residence time sufficient to promote the combustion of a substantial portion of said carbonaceous deposits from said spent catalyst, passing the air up through said bed at a rate sufficient to maintain the catalyst in a fluidized condition in said regeneration zone and to provide an exit gas from the first space containing at least about 2 percent oxygen, maintaining said regeneration zone filled with catalyst, continuously withdrawing regenerated catalyst product by gravity flow directly from the fluidized bed in the first space of the regeneration zone, passing out of the top of the first space of the regeneration zone partially utilized regeneration gas containing in suspension at least 1.5 kilograms of catalyst per cubic meter of gas, continuously adding freshly spent catalyst to be regenerated to said suspension intermediate said first and second combustion spaces and passing the resulting mixture up through said second combustion space comprising a vertically extended space of substantially smaller cross-section than said first space to an upper separation and collecting zone of larger cross-section than the second space, withdrawing flue gas substantially free of catalyst from said upper separation and collecting zone, passing catalyst from the collecting zone by controlled gravity flow to said first combustion space of the regeneration zone, and controlling the concentration of suspended catalyst passing out of the top of said first spent catalyst combustion space and into the second space at a value of at least 1.5 kilograms of catalyst per cubic meter of gas by controlling the rate of said last mentioned gravity flow of catalyst from the collecting zone to the said first spent catalyst combustion space of said integral regeneration zone.

2. Process according to claim 1 further characterized in that the last mentioned gravity flow of catalyst from the collecting zone to the first spent catalyst combustion space of the integral regeneration zone is controlled to exceed both the flow rate of spent catalyst to be regenerated and the flow rate of the said withdrawn regenerated catalyst, and the catalyst density in the second combustion space is maintained at from about 7.5 to 25 kilograms per cubic meter.

3. Process according to claim 1 wherein the regeneration is effected at a temperature within the range of about 500 to 650° C.

References Cited in the file of this patent
UNITED STATES PATENTS

| | | |
|---|---|---|
| 2,337,684 | Scheineman | Dec. 28, 1943 |
| 2,369,523 | Belchetz | Feb. 13, 1945 |
| 2,378,607 | Watts | June 19, 1945 |
| 2,394,710 | McAfee | Feb. 12, 1946 |
| 2,449,622 | Roetheli | Sept. 21, 1948 |
| 2,454,373 | Blanding | Nov. 23, 1948 |
| 2,475,650 | Thompson et al. | July 12, 1949 |
| 2,534,778 | Kuhn | Dec. 19, 1950 |